United States Patent [19]
Spiro

[11] Patent Number: 5,819,228
[45] Date of Patent: Oct. 6, 1998

[54] HEALTH CARE PAYMENT SYSTEM UTILIZING AN INTENSITY ADJUSTMENT FACTOR APPLIED TO PROVIDER EPISODES OF CARE

[75] Inventor: Alan Spiro, Highland Park, Ill.

[73] Assignee: Utilimed, Inc., Northbrook, Ill.

[21] Appl. No.: 550,744

[22] Filed: Oct. 31, 1995

[51] Int. Cl.$^6$ .......................... G06F 159/00; G06F 17/60
[52] U.S. Cl. ................................... 705/2; 705/4; 705/34; 705/40
[58] Field of Search .................................. 395/201, 202, 395/203, 204, 230, 232, 234, 235, 238, 240, 239; 705/1, 2, 3, 4, 30, 32, 34, 35, 38, 39, 40; 283/59, 900; 346/33 ME; 128/630, 920

[56] References Cited

U.S. PATENT DOCUMENTS

| 4,491,725 | 1/1985 | Pritchard | 395/202 |
| 4,858,121 | 8/1989 | Barber et al. | 395/202 |
| 5,018,067 | 5/1991 | Mohlenbrock et al. | 128/630 |
| 5,225,976 | 7/1993 | Tawil | 395/202 |
| 5,301,105 | 4/1994 | Cummings, Jr. | 395/202 |
| 5,325,293 | 6/1994 | Dorne | 395/202 |
| 5,365,425 | 11/1994 | Torma et al. | 395/202 |
| 5,473,537 | 12/1995 | Glazer et al. | 128/630 |
| 5,483,443 | 1/1996 | Milstein et al. | 395/203 |
| 5,557,514 | 9/1996 | Seare et al. | 395/202 |
| 5,577,169 | 11/1996 | Prezioso | 395/61 |
| 5,652,842 | 7/1997 | Siegrist, Jr. et al. | 395/202 |
| 5,664,109 | 9/1997 | Johnson et al. | 705/2 |
| 5,666,492 | 9/1997 | Rhodes et al. | 705/3 |

OTHER PUBLICATIONS

Dialog File 15, Acc. #00960427; Prince, "Assessing Catholic Community Hospitals . . . ", *Health Care Management Review*, v. 19, n. 4 pp. 25–37 (14 pages), Fall 1994.

Dialog File 15, Acc. #01039387; Dzinkovoski; "CMAs & Health Care", *CMA Magazine*, v. 69 n. 4, pp. 25–28 (5 pages), May 1995.

*Primary Examiner*—David R. Hudspeth
*Assistant Examiner*—Joseph Thomas
*Attorney, Agent, or Firm*—Knechtel, Demeur & Samlan

[57] ABSTRACT

A method for providing a payment mechanism for outpatient diagnostic imaging services based upon an episode of care payment methodology. An episode of care is selected as a given time period during which all imaging studies performed for a given patient for one clinical indication. An episode of care may include multiple diagnostic imaging procedures. All tests performed by a provider within the given time period comprise one episode of care. An intensity adjustment factor based upon the types of imaging studies performed is multiplied against the total episodes of care. This results in a total intensity adjusted episode of care. Each provider's percentage of the total intensity adjusted episode of care is calculated, and each provider is paid from the funds collected from the members. Provisions are also made for giving credit to providers based upon the complexity of the imaging studies. Furthermore, providers can be given credit for consulting with the referring physician to provide the best imaging studies based upon the identified clinical conditions.

28 Claims, 13 Drawing Sheets

HEALTH CARE PAYMENT SYSTEM UTILIZING AN INTENSITY ADJUSTMENT FACTOR APPLIED TO PROVIDER EPISODES OF CARE

BACKGROUND AND SUMMARY OF THE INVENTION

This invention relates to an innovative payment mechanism for out-patient diagnostic imaging services but is also applicable to a payment mechanism based on any disease or diagnosis.

In recent years, costs associated with health care have been rapidly increasing. A variety of systems which utilize various computer hardware and software have been developed in an effort to simplify and expedite the processing of claims relating to health benefits. Furthermore, various methods have been devised to try to contain and control the rising costs. One such system is illustrated in U.S. Pat. No. 5,225,976 entitled *Automated Health Benefit Processing System*. This system utilizes a database having the benefits payable to an insured if the procedure is prescribed and performed by one of the available providers. Through the use of three processors, the medical procedure to be performed is selected, the treatment is actually performed by the provider, the provider's charges are inputted, and the treatment plan, treatment records, and amounts payable are calculated. Although this patent discloses an automated health benefit payment system, it does not provide a payment methodology which adjusts payments to providers based upon any adjustment factor nor does it provide any payment for consultation services.

U.S. Pat. No. 5,018,067 entitled *Apparatus and Method for Improved Estimation of Health Resource Consumption Through Use of Diagnostic and/or Procedure Grouping and Severity of Illness Indicators* discloses a computer software system for estimating the cost to treat a patient, based upon the condition of the patient, and to the extent that any treatments or procedures impact the patient's health status. The system uses the same information that is used as a basis for determining the Diagnostic Related Groups ("DRG's"). Clinical information is extracted by the Resource Estimating System from the International Classification of Diseases—9th Revision, Clinical Modification ("ICD-9-CM") codes and other available input data in order to make an estimate. The data is combined by the computer according to a formula that includes a set of constants for each DRG and which provides for variables depending upon each actual patient. The output provides a comparison on the basis of a homogeneous patient population to identify those providers whose practice patterns are of the highest quality and most cost efficient. Furthermore, the expected cost of treating a patient may be determined. By utilizing the method of this patent, a fixed reimbursement factor or relative weight is assigned to each DRG which determines the amount the hospital will be reimbursed for treatment of a patient. However, this system does not provide for an intensity adjustment factor to divide up a total pool of available funds for a specified period nor does it provide for payments for consultations in an effort to minimize or eliminate certain studies or procedures.

U.S. Pat. No. 5,301,105 entitled *Allcare Health Management System* discloses an integrated and comprehensive health care system which includes the interconnection and interaction of a patient, health care provider, bank or other financial institution, insurance company, utilization reviewer, and employer so as to include within the system all the participants to provide patients with complete and comprehensive health care and the financial system to support it. An obvious shortcoming of this system is that it does not provide for a means to have consultations between health care providers to minimize unnecessary treatments. Furthermore, it does not provide for payment of funds from a common pool over a specified period of time.

U.S. Pat. No. 4,858,121 entitled *Medical Payment System* discloses a system in which remote computer terminals are placed in the physician's office. These are connected by telephone lines with a central processing system. The data which is entered at the terminal is processed to incorporate previously stored data. The central processing computer processes the received data and formats it into a form for filing medical claims to the insurance company. Through an electronic funds transfer system, the funds are transferred directly to a patient's account and receipt of funds from the insurance company is acknowledged. Again, this system, as those previously disclosed, does not provide any incentive for providers to consult to minimize unnecessary procedures nor does it provide for payment of funds from a pool of funds over a predetermined time period.

According to the systems disclosed in the prior art, the payments made from a health care plan are based upon treatment for a particular patient for a particular DRG category from the period of time from the initial diagnosis through final treatment. Thus, the period of time during which payments are made is not a predetermined time but rather open-ended. This makes it difficult, if not impossible, to exactly divide a pool of funds for a given time period over services provided in that time period. Furthermore, the prior art does not disclose or teach the use of consultations to reward those persons who provide consultations to minimize unneeded procedures. Rather, the prior systems reward providers of services for services actually provided rather than rewarding those who consult in order to minimize unnecessary procedures. Accordingly, there is a need for a system which provides for payments to medical providers based upon a predetermined time period and, furthermore, a need to provide incentive for providers of medical services by most efficiently utilizing the test procedures available without ordering or requiring unnecessary or questionable tests.

BRIEF SUMMARY OF THE INVENTION

This invention relates to a method of providing payments to diagnostic imaging providers (normally radiologists) based upon an Episode of Care Payment Methodology. The goal of the compensation plan is to create financial incentives for radiologists, as consultants, to increase their interaction with referring physicians and to create incentives for ordering physicians and radiologists to select the best imaging studies, based upon the identified clinical conditions, to appropriately diagnose the patient.

An episode of care can be any selected time period but preferably is defined as all imaging studies performed for a given patient within a sixty-day window period, for one clinical indication. Thus, an episode of care may include multiple diagnostic imaging procedures. All tests done by a provider as part of the patient workup conducted within the sixty-day period comprise one episode of care.

The members of the health plan fund a diagnostic imaging provider account through fixed payments per month. The diagnostic imaging provider is credited with an episode of care for all imaging studies performed on a given member within the sixty-day period.

An intensity adjustment factor based upon the types of imaging studies performed is multiplied by the total episodes of care. This results in a total intensity adjusted episode of care. Each provider's percentage of the total intensity adjusted episode of care is calculated monthly, and each provider is paid from the funds collected from the members on a monthly basis. The complexity of each imaging study is weighed by assigning relative value units to each of the studies. Thus, a provider who performs more complicated or in depth studies is given greater weight than simple studies.

The episode of care payment methodology provides an incentive to diagnostic imaging providers to participate in reducing inappropriate utilization and/or studies. The methodology rewards diagnostic imaging providers financially as the number of studies per episode of care declines and as the number of episodes of care for a given population decreases. Furthermore, the methodology can include radiologist-physician interaction in the episode of care payment calculation. This is accomplished by a consultation between a radiologist and physician being documented and included in the calculation of the episode of care payment methodology.

In another embodiment, there is provided a method of providing payments to health care providers based upon specific diseases or a specific diagnosis rather than diagnostic imaging studies. Thus, the same methodology of payment can be used for health care providers in the diagnosis or treatment of specific diseases such as heart disease, diabetes, breast cancer, etc.

Objects and Advantages

It is an object of the present invention to provide a unique method of providing payments to diagnostic imaging providers of a health care plan. It is a further object to base such payments upon imaging studies performed within a given time period. It is a related object to base the amounts of such payments upon the type and complexity of the imaging studies performed.

It is yet another object to allocate funds received from the members of the plan among the imaging providers based upon the percentage of the studies performed by the health care providers. It is a related object to adjust the funds paid to the providers based upon the number and types of studies provided by each imaging provider.

Yet another object is the object of providing a method of providing payments to health care providers of a health care plan based upon specific diseases or a specific diagnosis.

It is yet another object to provide payment from the health care plan for consultation services performed by a radiologist based upon the consultation.

These and other objects of the invention will be apparent upon reading the brief description of the drawings and description of the preferred embodiment.

DESCRIPTION OF THE PREFERRED EMBODIMENT

Figure 1:
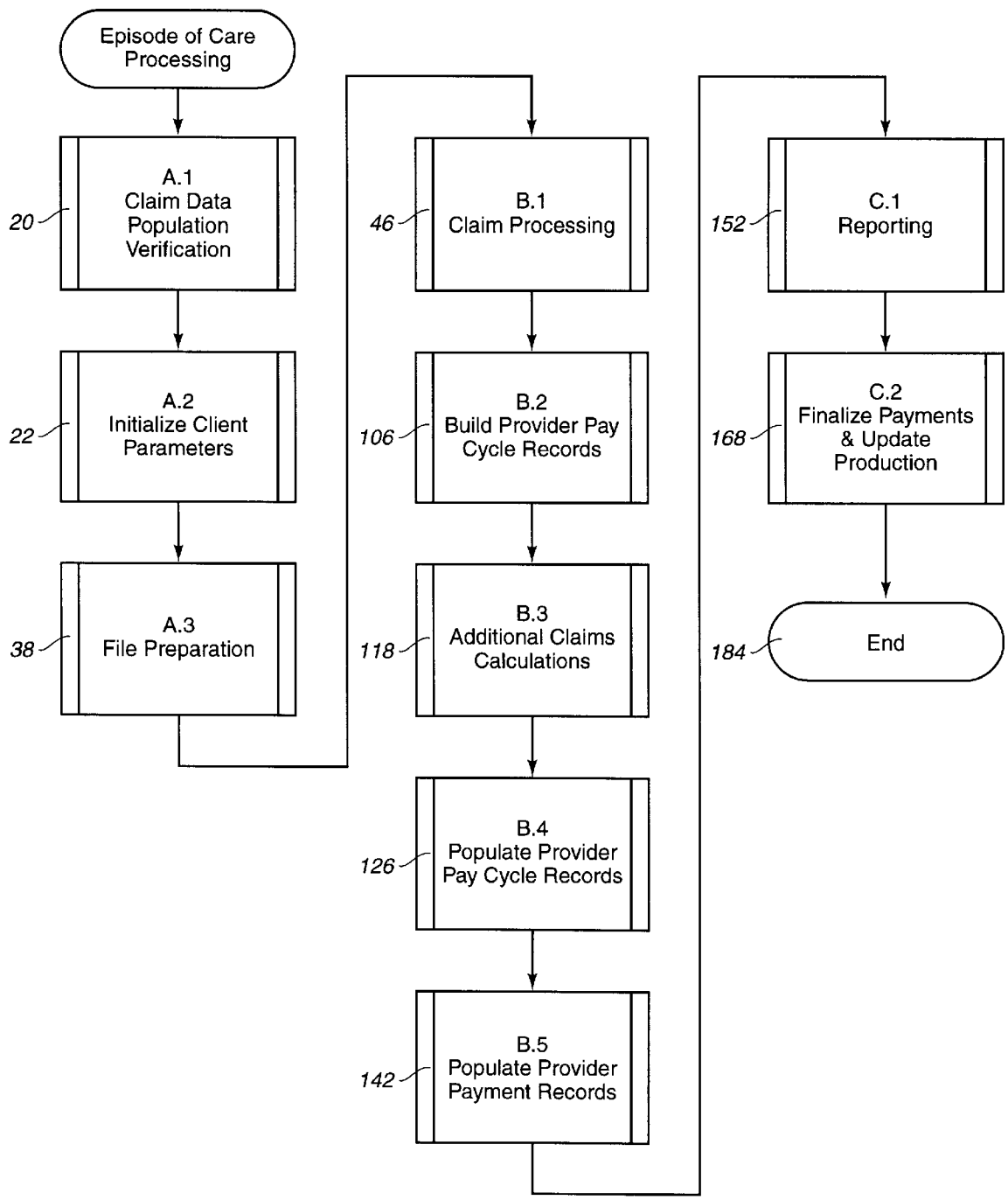
FIG. 1 is a block flow diagram illustrating the overall episode of care payment methodology according to a preferred embodiment of the present invention.

Turning first to FIG. 1, there is illustrated the overall method for calculating and providing payments to diagnostic imaging providers of a health care plan. In step 20, all incoming data is examined. The data is obtained from a claim submission form such as a Health Care Financing Administration (HCFA-1500) standard health insurance claim form. Alternatively, the information can be obtained from a form UB-92 which is the 1992 revision of the Uniform Billing Medicare Insurance Claim Form. Alternatively, the information can be obtained from electronic data input. Each procedure for each individual patient is inputted. All information is verified and validated. Step 20 is essentially a data load function to place the incoming data into a configuration such that the data can be processed.

Figure 2:
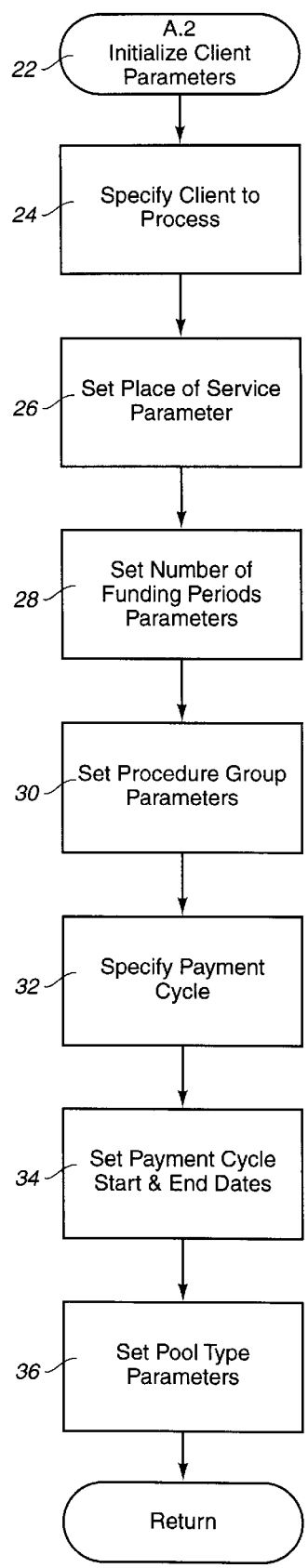
FIG. 2 is a block flow diagram illustrating the procedure to set all initial client parameters.

At step 22, client parameters are initialized (see FIG. 2). All of the health plan parameters are set. At step 24, a specific health plan which is to be processed is identified. At step 26, valid places of service for the health plan are identified. For example, each health care plan will have particular locations at which services are performed. These can be either outpatient or inpatient locations.

At step 28, the number of funding periods and the funding period parameters are established. As most participants in health care plans are accustomed to monthly payments, each funding period is set at one month. At this step, the length of time over which an episode of care is to be calculated is also established. An episode of care is defined as all imaging studies performed for a given patient within a pre-set time period for one clinical indication. Generally, the pre-set time period is set at sixty days. Depending upon the particular plan, the episode of care time period can be set to times other than sixty days such as thirty days or ninety days. One episode of care may include one or multiple procedures. For example, a patient undergoing imaging studies for abdominal pain may have, as part of the work up, an upper GI x-ray, an abdominal ultrasound, and a CT-Scan. All three tests performed comprise one episode of care. The number of funding periods is also set in step 28. This is the length of time over which money is disbursed to the imaging providers from a particular funding period. After this time period is established and the funding period is closed, no further funds are paid to the providers from the particular funding period.

At step 30, valid procedure groups for the health plan are identified. At step 32, the payment cycle for the health plan is specified. For example, a funding cycle may be six months made up of six one-month payment cycles. At step 34, the payment cycle beginning and ending dates are defined.

At step 36, valid pools are defined for the health plan. These pools are funded monthly. There is more than one pool of money to pay providers. For example, radiologists are paid from a diagnostic imaging provider account. Cardiologists are paid from another pool or account. The establishment of the various pools and the amount of money funding each of the pools is based on a particular plan with a given health maintenance organization or other health care provider. It is established at the beginning of the overall program so that each health care plan will customize and set its plan according to its own parameters.

Figure 3:
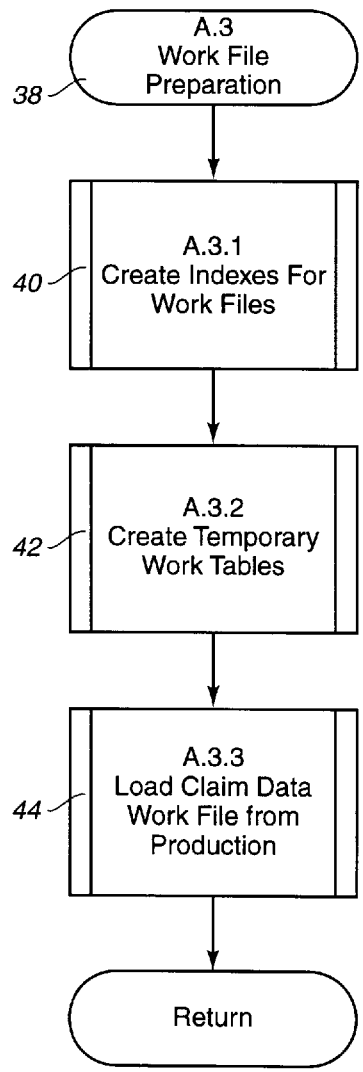
FIG. 3 is a block flow diagram illustrating the procedure for preparing and using the work files.

At step 38 (see FIG. 3), various data housekeeping functions are performed. For example, at step 40, indexes for work files are created. This is a standard processing procedure and allows processing of the information to be more expedient. At step 42, temporary work tables are created.

At step 44, the claim data work file is loaded from the production files. In this manner, the permanent files are left intact and the manipulation of the data is done on a copy. Upon completion of step 44, actual claim processing at step 46 is begun.

Figure 4:
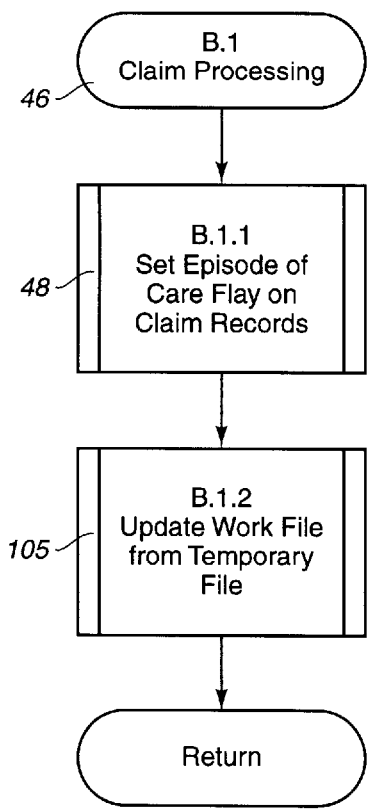
FIG. 4 is a block flow diagram illustrating the procedure for the claim processing routine.
Figure 5:
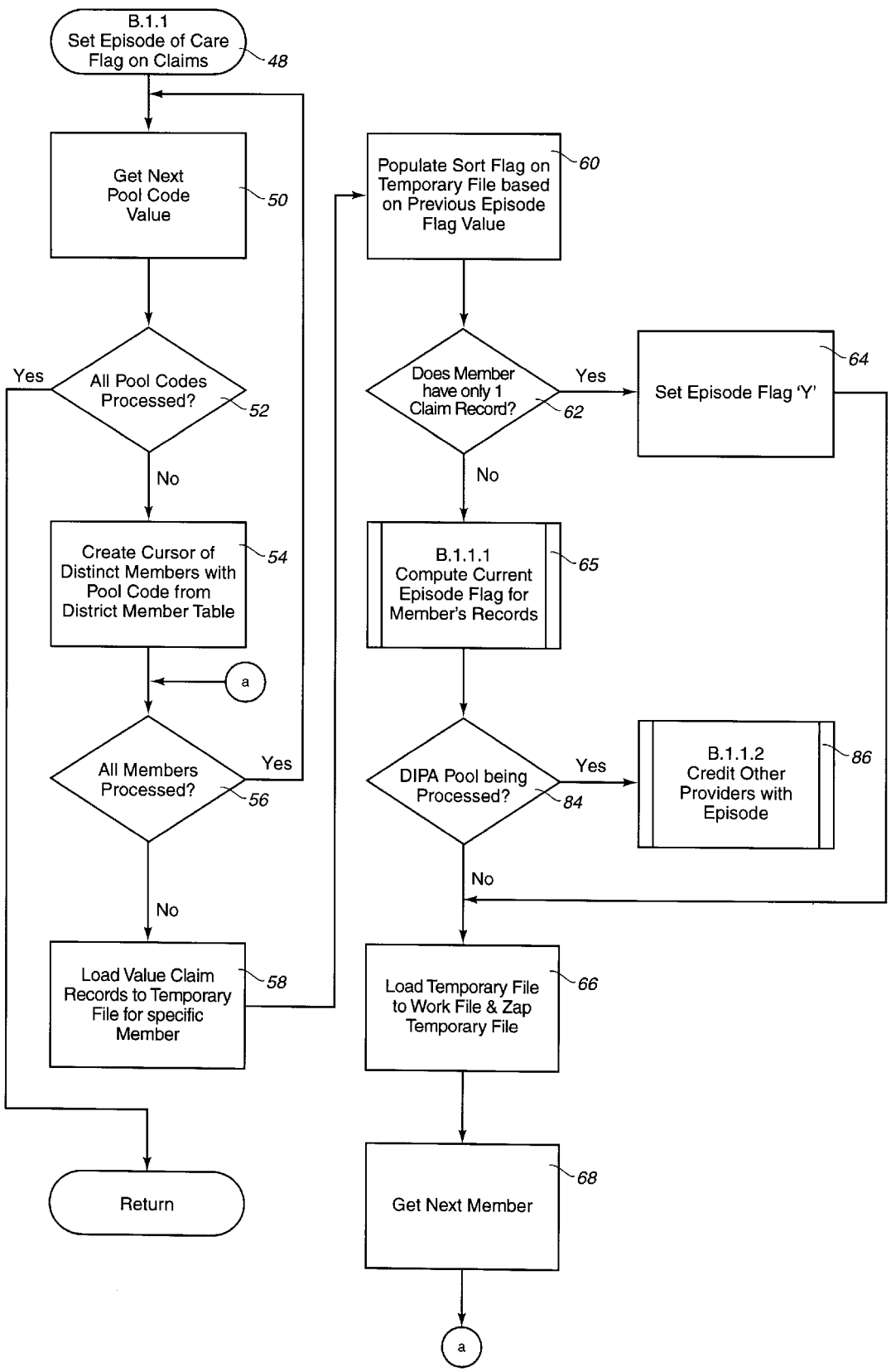
FIG. 5 is a block flow diagram illustrating the routine used to determine whether a claim is assigned an episode of care.

In FIGS. 4 and 5, the claim processing step 46 is more fully described. At step 48, it is determined whether or not a claim receives an episode of care flag. The procedure as illustrated in FIG. 5 is repeated for each of the pools that were initially established at step 36. For example, if there are three pools of money, the program will go through the steps in FIG. 5 three times, once for each of the three pools.

At step 50, the first pool is examined. Upon subsequent repeating of the procedure, the program increments and proceeds to the next pool. At step 52, it is determined if all pools have been processed. If the answer is yes, the program returns to the main program. If the answer is no, the program proceeds to step 54 wherein a file is created that looks at each member's examination for each pool. A table is created for each person or member with a pool code assigned from the member table.

At step 56, the program determines if all members have been processed. If the answer is no, the program proceeds to step 58 wherein claims meeting the episode of care parameters are loaded in a temporary file for that specific member. At step 60, the claims are flagged with a sort value based on the previous value of the episode flag for the members. At step 62, the program determines whether the member had only one claim record. If the answer is yes, an episode of care flag is set at step 64 for the procedure. At step 66, the temporary file is transferred to a work file and the temporary file is cleared. The program proceeds to the next member at step 68 and repeats at step 56.

Figure 6:
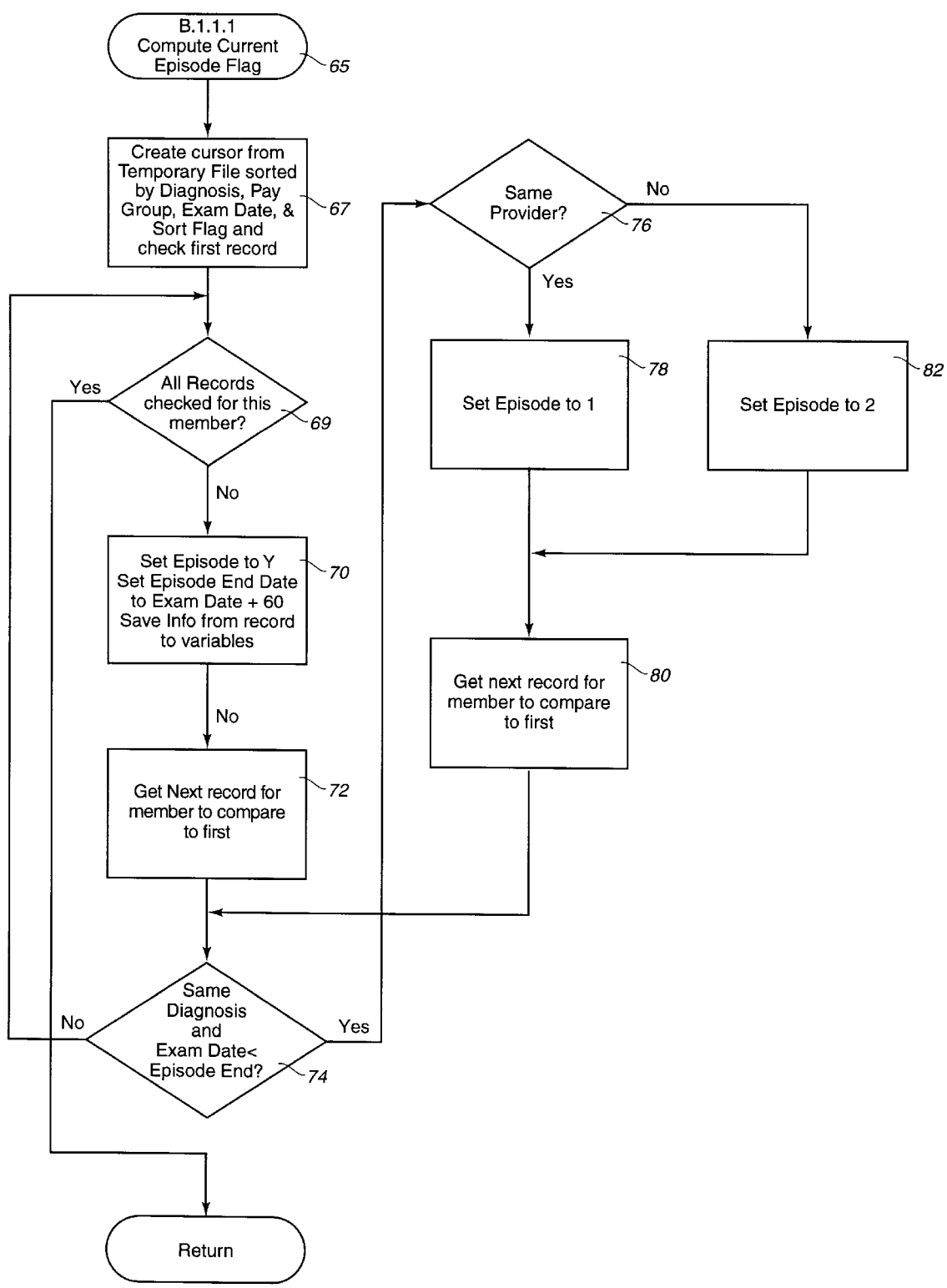
FIG. 6 is a block flow diagram illustrating the sub-routine to compute the current episode of care for the individual member's records.

Regressing to step 62, if the member has more than one claim, the program proceeds to step 65 which decides which claims receive the episode of care flag. Thus, a determination is made which claim and provider or providers performed procedures which will receive credit for an episode of care. This is more fully illustrated in FIG. 6.

At step 67, a table is created from the temporary file which is sorted by diagnosis, pay group, examination date, and the sort flag. At step 69, if all records have been checked, the program returns to step 84. If they have not been checked, the program proceeds to step 70 where the episode of care is set to a "y" or "yes" indication as this is the first claim for this diagnosis. The ending date for an episode of care is now established from the examination date on this claim. Generally, this is set as sixty days, but other time periods can be used.

At step 72, the next record for the member is retrieved and compared to the first record. At step 74, if it is the same diagnosis and the examination date is less than the episode of care ending date, the program proceeds to step 76 to determine if the procedure was performed by the same provider. If the diagnosis is different or the claims' date of service is beyond the episode end date, return to step 69. If the answer is yes, the episode of care is set to one at step 78. The program proceeds at step 80 to the next record for the member to compare it to the first record. The comparison process goes back to step 74. At step 76, if the procedure was not performed by the same provider, the program proceeds to step 82 and the episode of care is set to two.

Figure 7:
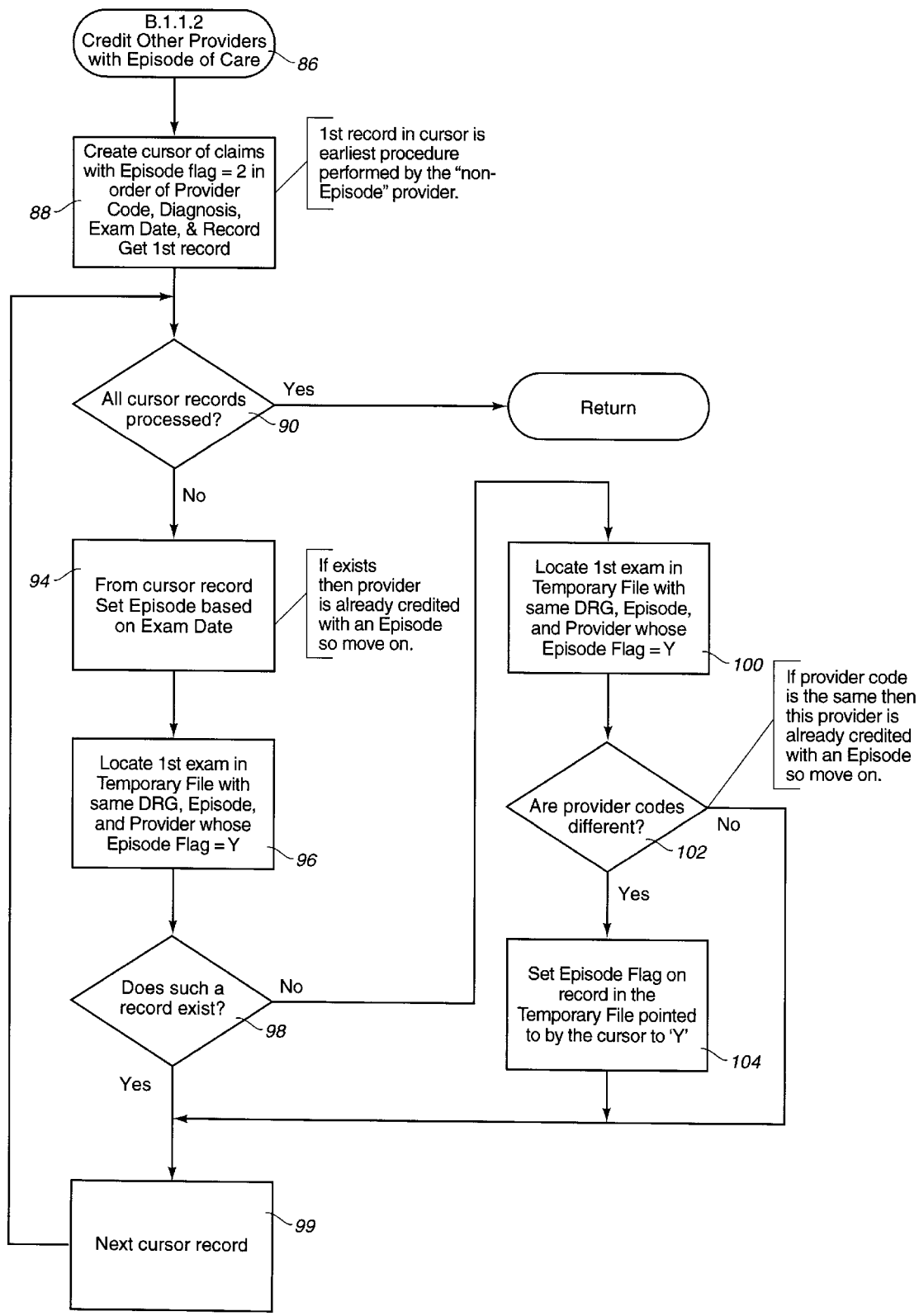
FIG. 7 is a block flow diagram illustrating the routine to credit other providers with an episode of care.

After all records have been checked, the program returns to step 84 (see FIG. 5). Here, it is determined whether the diagnostic imaging provider account pool is being processed. If the answer is no, the program proceeds to step 66. If the answer is yes, the program proceeds to step 86 for additional processing. As seen in FIG. 7, the program determines if there is more than one provider, and if there are other providers, should they be credited with an episode of care.

If another provider is to receive credit for an episode of care, he is first identified at step 88 where a table is created of claims having an episode of care flag equal to two. This table is created in the order of provider code, diagnosis, examination date, and patient records. The first record is retrieved. At step 90, it is determined if all cursor records have been processed. If the answer is yes, the program returns to the main program at step 66. If the answer is no, the program proceeds to step 94 where the episode of care based upon the examination date is established.

At step 96, the first examination is located in the temporary file created at step 58 with the same DRG, episode of care and provider whose episode of care flag had a "y." At step 98, the program searches to check if such a record exists. If it does, the program proceeds at step 99 to the next cursor record. If such a record does not exist, the program locates at step 100 the first examination in the temporary file with the same DRG and episode of care whose episode of care flag was a "y."

At step 102, the program checks to see if the provider codes are different. If they are, the program proceeds to step 104 where it will set an episode of care flag on the record in the temporary file indicated by the cursor to a "y." If the answer is no, the program proceeds back to step 99 to the next cursor record. In this manner, an episode of care is credited to a second provider even though the first provider is also given credit for an episode of care. At step 99, the program gets the next cursor record and returns to step 90. Once this is completed, a work file is updated from the temporary file at step 105.

Now that the claims for all members have been processed in step 46, the provider pay cycle records can be constructed at step 106. Each provider may have a different pay period. This sub-routine keeps track of how many members were seen and amounts to be paid. There is a storage area for tabulating the members that were seen, when they were seen, by whom, etc. This allows us to later make payments to the provider. Each provider receives his own record for each month's services rendered.

At step 108, the previous pay cycle is reviewed and is loaded to a temporary file. At step 110, a work file is prepared for the current pay cycle, and at step 112, any new pay records are added to the temporary file. Essentially, at step 112, the data which was temporarily loaded and created in steps 108 and 110 is combined.

At step 114, missing records are created for any new providers even if zeros must be entered for past months' work if the provider did not perform any work in the previous month. In this manner, amounts to be paid over an entire funding period can be computed. The program then returns to the main program at step 116.

Figure 9:
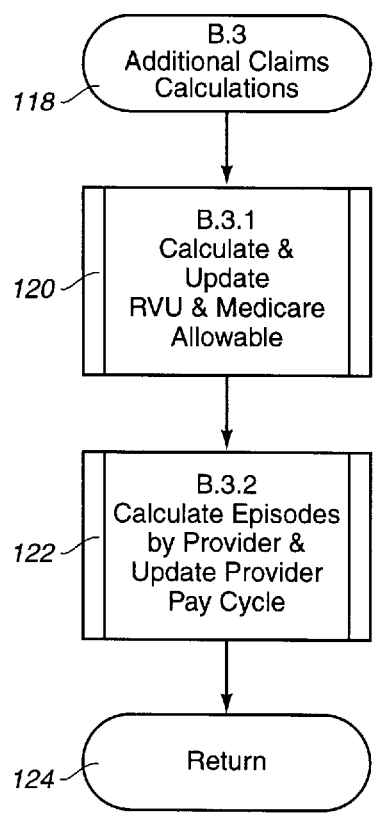
FIG. 9 is a block flow diagram illustrating additional calculations performed on various claims, including calculating the intensity adjustment factor and the tabulation of the episodes of care.

Additional claim calculations are performed at step 118 as more fully illustrated in FIG. 9. At step 120, the intensity adjustment factor is calculated. The intensity adjustment factor can be set in a table which is subject to modifications by the age of the member or other parameters. The relative value units ("RVU's") are set by Medicare and are not generally adjusted.

Figure 8:
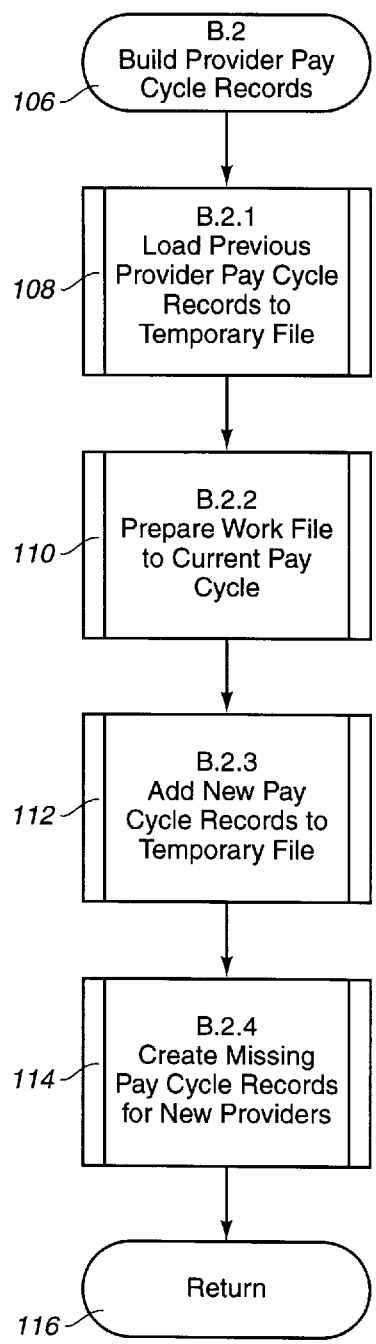
FIG. 8 is a block flow diagram illustrating the routine by which provider's data is stored and tabulated for members that were seen in a given period.

At step 122, the episodes of care of each provider are added. This information is then used to update the provider information pay cycle created in FIG. 8. The program returns to the main program at step 124.

Figure 10:
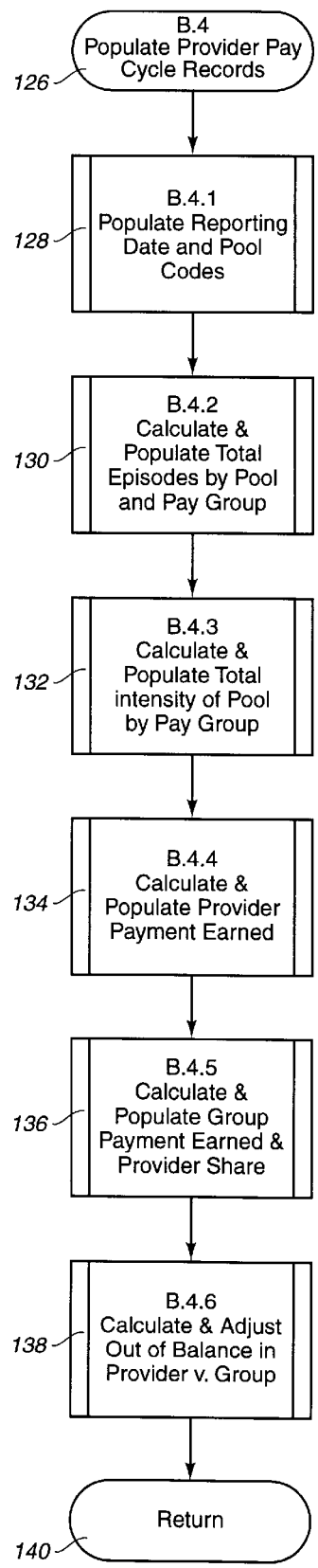
FIG. 10 is a block flow diagram illustrating the method used to complete the calculations for all of the fields for preparing and calculating payments to particular providers and groups.
Figure 11:
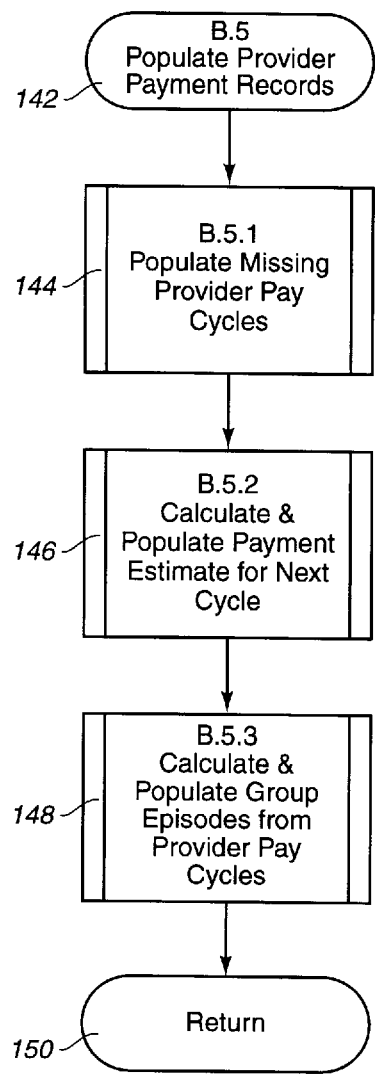
FIG. 11 is a block flow diagram illustrating the steps to populate the provider payment records.
Figure 12:
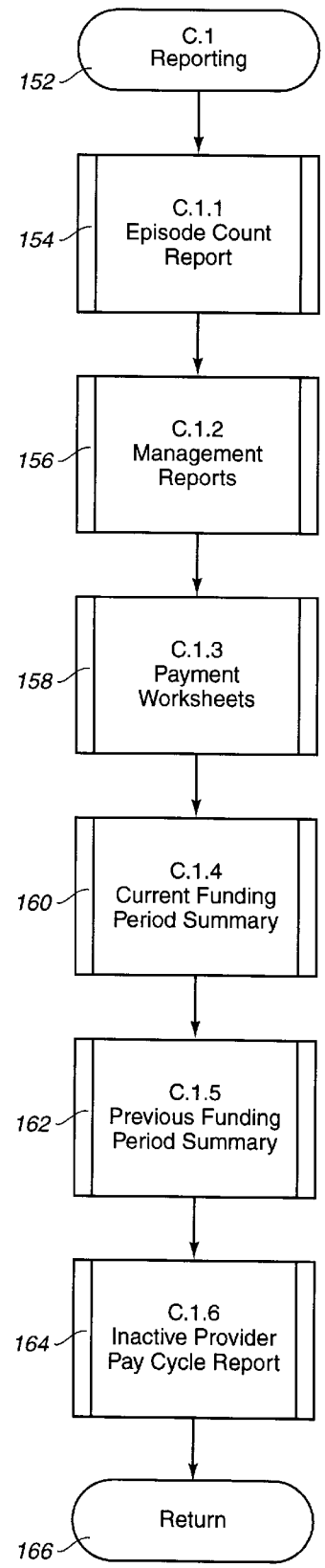
FIG. 12 is a block flow diagram illustrating the steps to provide the various reports to the providers.

At step 126, the provider pay cycle records are populated. Essentially, the table established in step 106 is populated by filling out all of the fields. As seen in FIG. 10, at step 128, the reporting date and valid pool codes are inserted. The date parameters for a record are entered and tied into the current month and the month in which the services were provided.

At step 130, the episodes of care for each provider in the pay cycle table are added. Each provider gets paid by the pool group he is in, the episodes of care done by the entire pool, and those done by him. The pay group may be one individual or may be a group of radiologists working together. At step 132, the total intensity adjustment by pool and pay group is calculated. The intensity adjustment factor is derived by dividing the total number of relative value units associated with all procedures performed during a one-month period by the total number of procedures actually performed in the same one-month period.

At step 134, the money which is to be paid for each individual provider is calculated. At step 136, the payments earned by a group, where a group of providers practice together, is calculated.

At step 138, provisions can be made for a different formula for payment to each of the members of a particular provider when the provider is made up of a group of radiologists. The program also checks to verify the total paid to the members of a group is equal to the sum allocated for that group. The program then returns to the main program at step 140.

At step 142, the table from which the payments are made is created. First, the provider payment records are populated. At step 144, any missing provider pay cycles are populated. If there was not a previous pay cycle, one is created.

At step 146, an estimate of what the payments will be for the next billing cycle is performed. At step 148, a calculation is made as to payments for group episodes of care which is provided from step 126. The program returns to the main program at step 150.

Step 152 illustrates the reporting routine. At step 154, an episode of care count report is generated. At step 156, various types of management reports can be prepared. At step 158, payment worksheets are created which go to the finance department so that checks can be issued.

At step 160, a current funding period summary is prepared. This consists of the money that is coming in to fund the pools on a monthly basis from the members and also describes the money that was paid out in the funding period. This would be similar to a monthly operating statement.

At step 162, the previous funding period summary is prepared. This is similar to the report prepared at step 160 except it is for the previous month.

At step 164, an inactive provider pay cycle report is prepared. This is a report for closed time periods and lists inactive providers. At step 166, the program returns to the main program.

Figure 13:
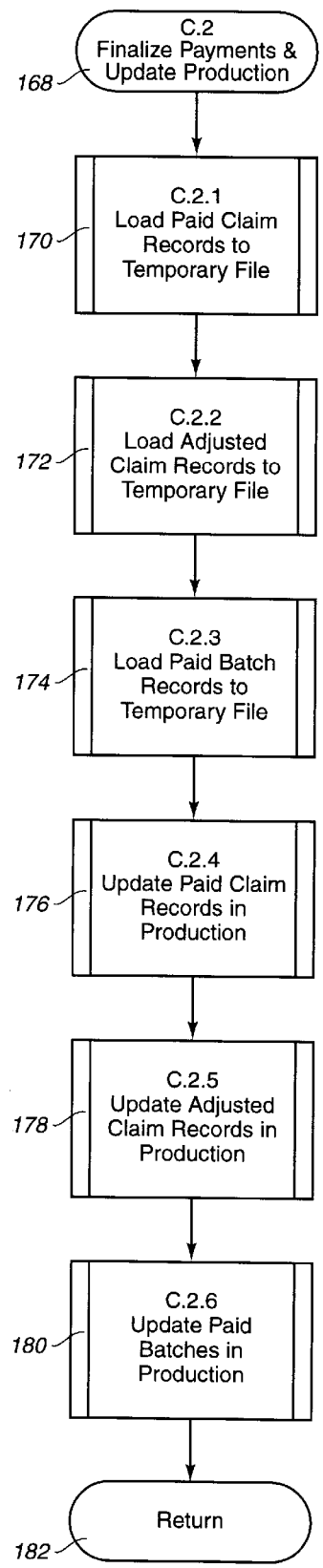
FIG. 13 is a block flow diagram illustrating the updating of the database after the calculation and payment of amounts to providers.

As illustrated in FIG. 13, the final step 168 is performed. Here, all information such as payments and production are updated within the database. All records of receipts and payments for the month are saved. At step 170, all of the paid claim records are loaded to a temporary file.

At step 172, all adjusted claim records are loaded to a temporary file, and at step 174, all paid batch records are loaded to a temporary file. Essentially, the steps 170, 172 and 174 will extract the desired information and place it in a temporary file in a desired format. At step 176, the paid claim records are updated into the production files. Likewise, at steps 178 and 180, the adjusted claim records and the paid batches are updated and placed in the production files.

In steps 176 through 180, each record is reviewed and updated to the production or permanent file. If it is a paid claim, it is marked in the production file as "paid." If it is a new file, then it is merely updated to the production files. Once this is completed, the program returns to the main program where it ends at step 184.

It is also possible to provide credit and payment to radiologists to consult with referring physicians. This program acknowledges radiologists' contribution to optimizing patient care quality and minimizing expense through consultation. Payment for consultation significantly enhances the incentives already inherent in the episode of care payment methodology. This payment methodology financially rewards imaging providers as the number of studies per episode of care declines. Imaging providers also benefit in the aggregate as the number of episodes of care for the health plan's membership declines and incentive that is further enhanced by the inclusion of payment for consultation.

The process for identifying a consultation is when the radiologist confers with the referring physician by telephone or in person for instances in which there is a question about whether a study is indicated. The radiologist documents the consultation by means of a HCFA-1500 Form or by any other appropriate form. The outcome of the consultation and place of service is also entered. For purposes of calculating the intensity adjusted episode of care, which determines the proportionate share a given provider receives from the diagnostic imaging provider account, the consultation is counted as an imaging procedure and the individual provider is assigned his group's average relative value unit to the consultation. The average relative value unit is specific to the individual provider and is based on all diagnostic imaging procedures performed and will be recalculated and assigned every six months. The assignment of an average relative value unit to the consultation properly aligns the financial incentives to encourage imaging providers to consult versus not consult when questions of efficacy arise. If no study is performed, the consultation is equivalent to an episode of care. If a study is also performed during an episode of care, the consultation will be treated as equivalent to an imaging procedure. In the manner described above, it can be seen that it is advantageous for not only the provider but the patient and overall system to take advantage of the consultation process to improve the delivery of medical services.

The episode of care payment methodology is more fully described and explained in the below example.

EXAMPLE I

The Diagnostic Imaging Provider Account ("DIPA") is funded based on the plan's membership and a fixed per member per month dollar amount (this is a global amount covering both the technical and professional components of diagnostic imaging). Monthly payments from this account are disbursed to diagnostic imaging providers according to each provider's proportionate share of the total Intensity Adjusted Episodes of Care ("IAEOC") per month.

One Episode of Care ("EOC") may include multiple procedures. The RVU's represented by each procedure are averaged when calculating the Intensity Adjustment Factor ("IAF"). Therefore, the payment for monthly EOC's will vary depending upon the provider's average complexity. The total payment per month will be a function of both the complexity adjustment and the total number of EOC's.

The initial date of service is established for an episode of care upon the receipt of a claim. This event or marker establishes the sixty-day window for the episode of care. The clinical condition is also used to identify other procedures being performed for that member within the sixty-day range but for conditions unrelated to the original service.

In the example below, Provider A has performed diagnostic imaging services for Member 100 on Jan. 1, 1995 for a specific clinical condition ("ICD9-123"). Since this is the first exam for that member within the sixty-day time frame, an episode of care ("EOC") has been assigned. A follow-up exam was performed on February 1. However, because the exam was performed for the same clinical condition within sixty days from the first exam, an episode of care was not assigned. The intensity of the services provided, i.e., the relative value unit ("RVU") of the procedure, will be included in the calculation of the total dollars assigned by Provider A as compared to the total diagnostic imaging network.

Analysis of Exams:

| Provider ID | Member ID | Date of Service | ICD9 | EOC | RVU's |
|---|---|---|---|---|---|
| A | 100 | 01/01/95 | 123 | Y | 2.0 |
| A | 100 | 02/01/95 | 123 | 1 | 2.0 |
| A | 100 | 02/15/95 | 234 | Y | 2.0 |
| A | 100 | 03/15/95 | 123 | Y | 2.0 |
| B | 200 | 01/05/95 | 456 | Y | 2.0 |
| B | 200 | 01/15/95 | 456 | 1 | 2.0 |
| B | 210 | 01/20/95 | 789 | Y | 2.0 |
| C | 210 | 01/25/95 | 789 | Y | 2.0 |

In addition, on February 15th, Provider A performed another procedure for Member 100. In this instance, the clinical condition is different ("ICD9-234"). Therefore, an episode of care has been assigned. A procedure was also performed on March 15th with the same clinical condition as the first service rendered. Because the procedure was performed outside of a sixty-day window, from Jan. 1, 1995, the provider was assigned another episode of care.

The same analysis also applies to Provider B and C. However, there is one distinguishing characteristic for the last exam performed by Provider B and the first exam performed by Provider C. In these cases, the same member was imaged at two different facilities on two different dates of service (within sixty days) for the same clinical condition and the same procedure was performed. In this instance, both providers will be assigned an episode of care.

ANALYSIS OF MONIES EARNED

In the table below, Provider A has performed four exams, totalling eight RVU's (each exam at an RVU of two, averaging two RVU's per exam), and three episodes of care. Multiplying the average RVU's per exam by the total episode of care assigned, equals the total intensity adjusted episodes of care. This is the basis for determining Provider A's portion of the diagnostic imaging provider account versus the portion earned by all other providers in the imaging network. In the example, Provider A has been assigned six percent of the total imaging account available for disbursement.

ANALYSIS OF MONIES EARNED:

| Provider ID | Total Exams | Total RVU's | Avg. RVU P/Exam | Total EOC | Total Intensity Adjusted EOC | % of DIPA |
|---|---|---|---|---|---|---|
| A | 4 | 8 | 2.0 | 3 | 6 | 6% |
| B | 3 | 6 | 2.0 | 2 | 4 | 4% |
| C | 1 | 2 | 2.0 | 1 | 2 | 2% |
| Other Imaging Providers | | | | | 88 | 88% |
| Total Diagnostic Imaging Network | | | | | 100 | 100% |
| Total Diagnostic Imaging Provider Amount (DIPA) | | | | | $10,000 | |

Provider B has a total of three exams, six RVU's with an average of two RVU's per exam. Two episodes of care have been assigned for a total intensity adjusted episode of care of four. The total diagnostic imaging network has 100 total intensity adjusted episodes of care. Determining Providers A, B, and C's portion of the Diagnostic Imaging Provider Account in comparison to the network become simple to calculate.

Finally, the last table illustrates the disbursement of the imaging provider account. Provider A has been assigned $6,000.00 (six percent of the total DIPA), Provider B, $4,000.00 and Provider C, $2,000.00. The example also provides other analyses regarding average dollars per exams, average dollars per RVU's, and average dollars per episode of care.

Disbursement of Account

| Provider ID | Total DIPA #'s | Avg $'s P/Exam | Age $'s P/RVU | Avg $ P/EOC |
|---|---|---|---|---|
| A | $600 | $150 | $75 | $200 |
| B | $400 | $133 | $67 | $200 |
| C | $200 | $200 | $100 | $200 |

The above example and description of the Preferred Embodiment were illustrative of a method of providing payments to diagnostic imaging providers. However, by merely a slight modification to the methodology, funding and payments can be made for or to any disease specific matter. Thus, the scope of the application should not be limited to only payments made to diagnostic imaging providers.

Accordingly, their has been described a method of payment for a health care system that fully satisfies the objects, aims, and advantages set forth herein. While the invention has been described in conjunction with a specific embodiment, it is evident that many alternatives, modifications and variations will be apparent to those skilled in the art in light of the foregoing description. Accordingly, it is intended to embrace all such alternatives, modifications, and variations as fall within the spirit and scope of the appended claims.

What is claimed is:

1. A computer implemented method of providing payments to diagnostic imaging providers of a health care plan comprising the steps of:

funding a diagnostic imaging provider account through a fixed per member per first-time period dollar amount;

crediting a provider with an episode of care which includes all imaging studies performed on a given member within a second time period for one clinical indication;

calculating an intensity adjustment factor for the provider based upon the types of imaging studies performed;

totaling the provider's episodes of care during the first time period;

calculating intensity adjusted episodes of care for the providers by indexing the totaled episodes of care by the intensity adjustment factor;

totaling the intensity adjusted episodes of care for all providers during the first time period;

calculating the provider's percentage of the total of all providers' intensity adjusted episodes of care for the first time period;

storing an amount representing the provider's percentage of the total of all providers' intensity adjusted episodes of care times the amount funded in the diagnostic imaging account in the first time period and paying the provider from the diagnostic imaging provider account the stored amount.

2. The method of claim 1 and the further step of assigning Relative Value Units to each type of imaging study.

3. The method of claim 2 wherein the intensity adjustment factor is derived by dividing the total number of Relative Value Units associated with all imaging studies performed during the first time period by the total number of imaging studies actually performed in the first time period.

4. The method of claim 3 wherein the time period during which the diagnostic imaging provider account is funded is based on a monthly dollar amount.

5. The method of claim 4 wherein the second time period for an episode of care is sixty days.

6. The method of claim 1 wherein the first and second time periods are the same.

7. The method of claim 1 wherein each provider is paid monthly from the diagnostic imaging provider account.

8. The method of claim 1 and the further step of creating additional accounts to pay non-diagnostic imaging providers without impacting payments to diagnostic imaging providers.

9. The method of claim 1 and the further step of crediting the provider with an imaging study for consulting with a referring physician regarding the requested diagnostic imaging study.

10. The method of claim 1 and the further step of crediting the provider with an episode of care for consulting with a referring physician regarding the requested diagnostic imaging study.

11. A computer implemented method of providing payments based on specific diseases to health care providers of a health care plan comprising the steps of:

funding a disease specific provider account through a fixed per member per first-time period dollar amount;

crediting a provider with an episode of care which includes all diagnostic studies performed on a given member within a second time period for a specific disease;

calculating an intensity adjustment factor for the provider based upon the types of studies performed;

totaling the provider's episodes of care for all providers during the first time period;

calculating an intensity adjusted episode of care of the providers by indexing the totaled episodes of care by the intensity adjustment factor;

totaling the intensity adjusted episodes of care for all providers during the first time period;

calculating the provider's percentage of the total of all providers' intensity adjusted episodes of care for the first time period;

storing an amount representing the provider's percentage of the total of all providers intensity adjusted episodes of care times the amount funded in the disease specific provider account in the first time period and paying the provider from the disease specific provider account the stored amount.

12. The method of claim 11 and the further step of assigning relative value units to each type of diagnostic study.

13. The method of claim 12 wherein the intensity adjustment factor is derived by dividing the total number of Relative Value Units associated with all diagnostic studies performed during the first time period by the total number of diagnostic studies actually performed in the first time period.

14. The method of claim 13 wherein the time period during which the disease specific provider account is funded is based on a monthly dollar amount.

15. The method of claim 13 wherein the second time period for an episode of care is sixty days.

16. The method of claim 11 wherein the first and second time periods are the same.

17. The method of claim 11 wherein each provider is paid monthly from the disease specific provider account.

18. The method of claim 11 and the further step of creating additional accounts to pay non-disease specific providers without impacting payments to disease specific providers.

19. The method of claim 11 and the further step of crediting the provider with a diagnostic study for consulting with a referring physician regarding the requested diagnostic study.

20. The method of claim 11 and the further step of crediting the provider with an episode of care for consulting with a referring physician regarding the requested diagnostic study.

21. A computer implemented method of providing payments to diagnostic imaging providers of a health care plan comprising the steps of:

funding a diagnostic imaging provider account through a fixed per member per first-time period dollar amount;

crediting a provider with an episode of care which includes all imaging studies performed on a given member within a second time period for one clinical indication;

assigning a Relative Value Unit to each imaging study;

calculating the average Relative Value Unites per imaging study;

totaling the provider's episodes of care during the first time period;

calculating an intensity adjusted episode of care for the providers by indexing the totaled episodes of care for the providers by the average Relative Value Units per imaging study;

totaling the intensity adjusted episodes of care for all providers during the first time period;

calculating the provider's percentage of the total of all providers' intensity adjusted episodes of care for the first time period;

storing an amount representing the provider's percentage of the total of all providers' intensity adjusted episodes of care times the amount funded in the diagnostic imaging account in the first time period and paying the provider from the diagnostic imaging provider account the stored amount.

22. The method of claim 21 wherein the time period during which the diagnostic imaging provider account is funded is based on a monthly dollar amount.

23. The method of claim 22 wherein the second time period for an episode of care is sixty days.

24. The method of claim 21 wherein the first and second time periods are the same.

25. The method of claim 21 wherein each provider is paid monthly from the diagnostic imaging provider account.

26. The method of claim 21 and the further step of creating additional accounts to pay non-diagnostic imaging providers without impacting payments to diagnostic imaging providers.

27. The method of claim 21 and the further step of crediting the provider with an imaging study for consulting with a referring physician regarding the requested diagnostic imaging study.

28. The method of claim 21 and the further step of crediting the provider with an episode of care for consulting with a referring physician regarding the requested diagnostic imaging study.

\* \* \* \* \*